Aug. 9, 1932.  J. M. SIMPSON  1,871,014
TRANSMISSION GEAR
Filed March 3, 1926   2 Sheets-Sheet 1

INVENTOR.
John M. Simpson,
BY
Hood + Hahn
ATTORNEYS

Patented Aug. 9, 1932

1,871,014

UNITED STATES PATENT OFFICE

JOHN M. SIMPSON, OF MUNCIE, INDIANA

TRANSMISSION GEAR

Application filed March 3, 1926. Serial No. 91,895.

My invention relates to improvements in transmission gearing and particularly to transmission gearing for automobiles. In certain types of transmission gearing means are provided whereby through the transmission the car may be propelled at a higher speed than the normal high speed of the driving shaft without increasing engine speeds.

In certain types of such transmission among which is one disclosed in my Patent No. 1,802,482 granted April 28, 1931, there is provided an overspeed gearing wherein the driving gear consists of an internal gear meshing in turn with an eccentrically mounted external and internal gear, the internal teeth of which are adapted to mesh with a driven pinion mounted on the driven shaft. I have found that such a construction will provide an overspeed gearing which is decidedly noiseless as compared with the ordinary type of gear.

My present invention relates to improvements in this type of transmission and has for one of its objects the provision of bearing supports so arranged that the overhang, particularly of the internal gears, may be reduced to the minimum and a more properly balanced gearing system thus obtained.

Certain other advantages will more fully appear in the accompanying specification and claims.

For the purpose of disclosing my invention I have illustrated one embodiment thereof in the accompanying drawings in which Fig. 1 is a longitudinal section of an automobile transmission embodying my invention;

Figure 1:
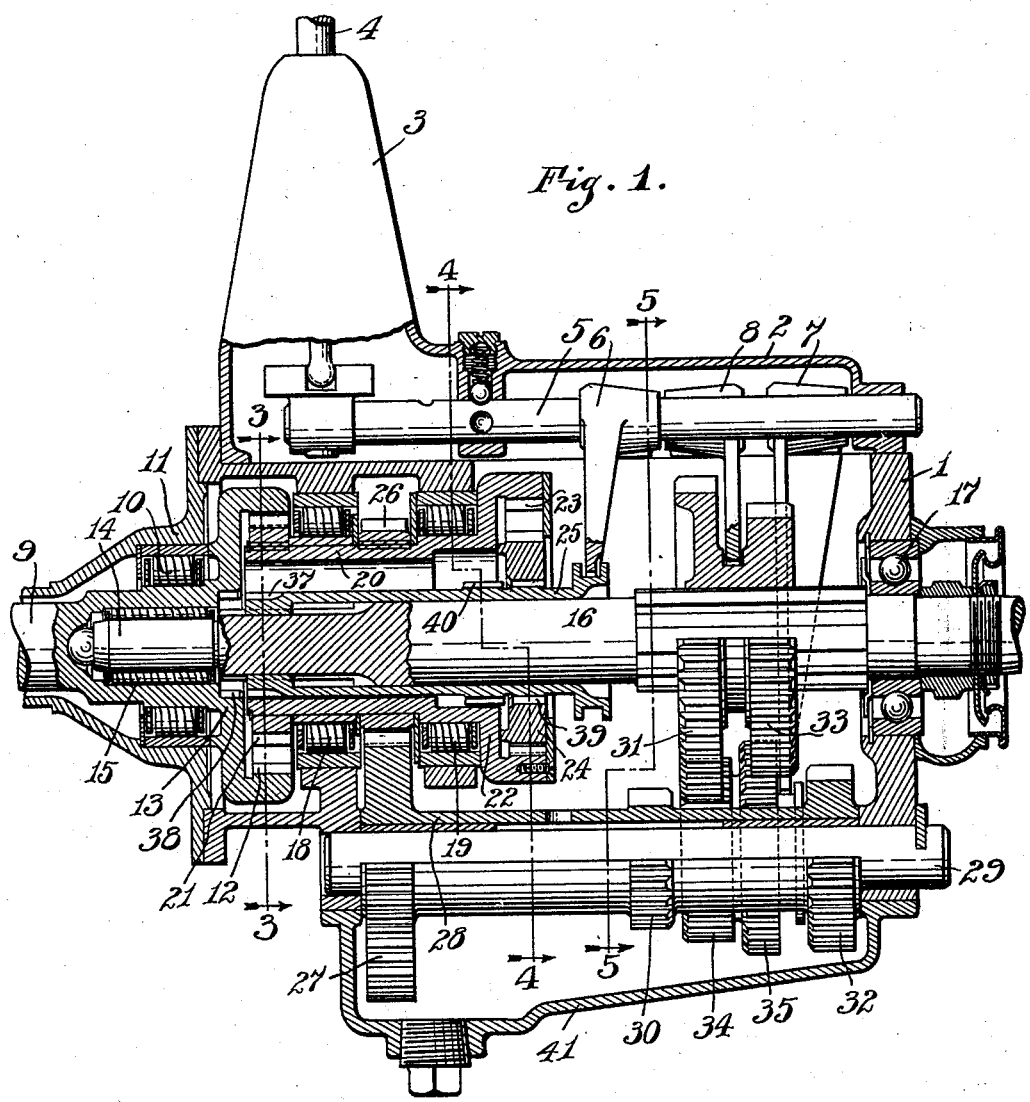
Figure 2:
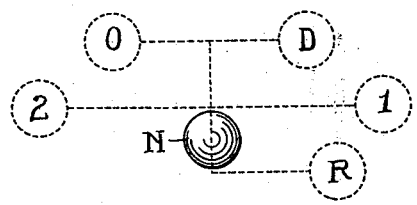
Fig. 2 is a diagrammatic view of the shifting movements of the speed changing lever to obtain the proper meshing of the gears for the various desired speed changes.
Figure 3:
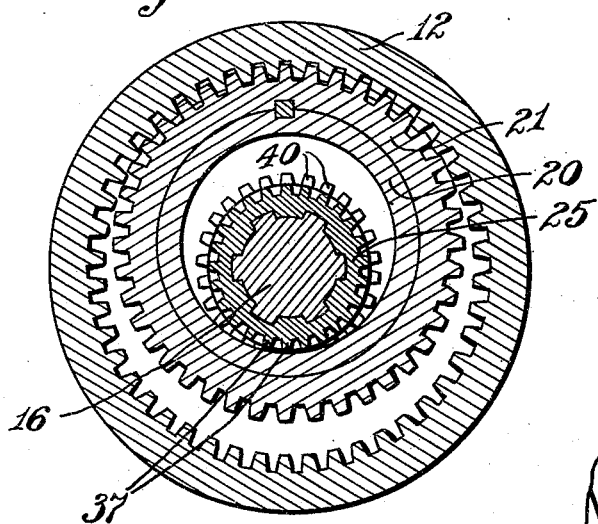
Fig. 3 is a sectional view on the line 3—3 of Fig. 1.
Figure 5:
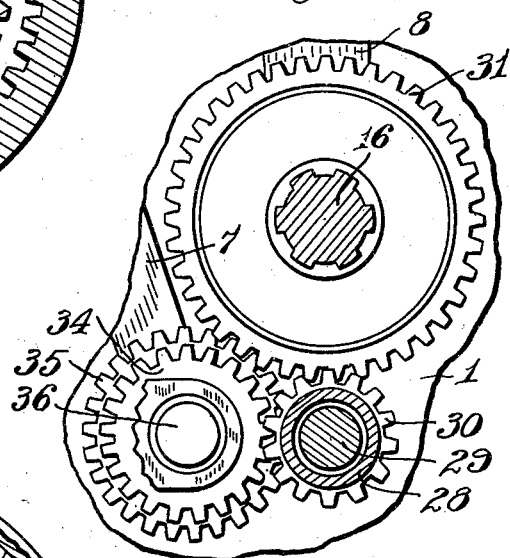
Fig. 5 is a sectional view on the line 5—5 of Fig. 1.
Figure 4:
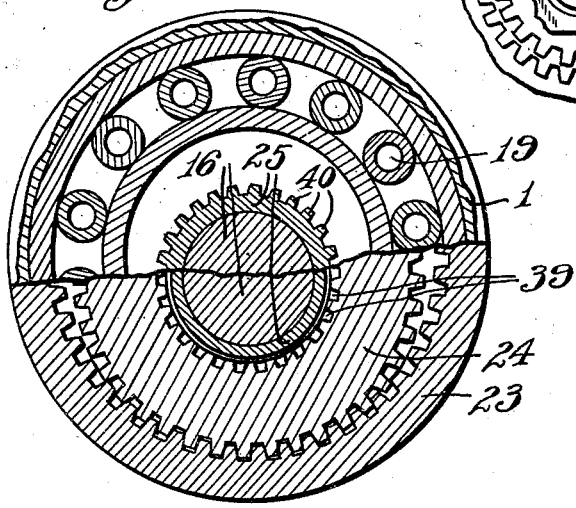
Fig. 4 is a sectional view on the line 4—4 of Fig. 1.

In the embodiment illustrated I provide a transmission casing 1 which may be of any suitable type having a top 2 provided with the shifting lever cone support 3 in which is mounted for universal movement the shifting lever 4 adapted to operate the sliding rods 5 provided with the usual shifting forks 6, 7 and 8.

The driving shaft 9 which is connected with the engine shaft through the usual clutch member has its rear end journaled in suitable roller bearings 10 arranged in the front wall 11 of the casing. This driving shaft is provided at its inner end and within the casing with an internal ring gear 12 the hub 13 of which may be formed integrally with the inner end of the shaft 9.

The driven shaft is adapted to extend through the casing and have its forward end 14 taking into the recessed rear end of the shaft 9 and supported in suitable roller bearings 15 in said shaft 9. The opposite end of this driven shaft 16 projects through the rear wall of the casing 1, being supported in suitable ball bearings 17 and being adapted to be connected by the usual transmission shaft and universal joints with the driving system of the car.

Surrounding the shaft 16 and eccentrically mounted with respect thereto in the pair of spaced apart roller bearings 18 and 19 is a hub member 20 having secured thereon at one end an external gear 21 projecting into and having its teeth engaging with the internal gear 12. This hub member 20 at its opposite end has a hub 22 provided with an internal ring gear 23 which in turn meshes with the external teeth of a pinion 24 on a sleeve 25 surrounding the shaft 16 and splined thereon.

The main drive gear 26 of the transmission is mounted on and rotates with the hub member 20 being located on said hub member between the bearings 18 and 19 for said hub member. This driving gear rotates on the eccentric center of the rear internal gear 23 and meshes with and drives a gear 27 on a sleeve 28 rotatably mounted on the shaft 29. This sleeve carries in addition to the gear 27 a driving pinion 30 adapted to mesh with, for low speed, a driven gear 31 splined on the shaft 16. The sleeve 28 also carries a driving pinion 32 slightly larger than the pinion 30 and adapted to mesh with, for intermediate speed, the driven gear 33 likewise splined on the shaft 16.

For obtaining reverse drive I provide a pair of gears 34 and 35 mounted on a countershaft 36 which are adapted to be respectively moved into mesh with the pinion 30 and the gear 31.

The sleeve 25 has at its forward end a series of clutch teeth 37 adapted when the sleeve is moved forwardly to mesh with the internal teeth 38 formed in the hub 13 and when in such mesh the drive shaft 9 will be drivingly directly connected to the driven shaft 16 so that this shaft 16 will be operated at the same speed as the shaft 9. When this clutch is moved to neutral position, the position shown in Fig. 1, the drive from shaft 9 will be through the internal gear 12, the external gear 21 on hub 20, the main driving gear 26 to the gear 27 and thence through the pinion 30 and gear 31 or pinion 32 and gear 33 depending upon the meshing of these gears and as heretofore explained when gear 31 is in mesh with pinion 30 the driven shaft 16 will be operated at low speed and when the pinion 32 is in mesh with 33 the driven shaft 16 will be operated at intermediate speed.

The pinion 24 has a series of internally broached teeth 39, the gear centering on the sleeve 25 directly on the tops of these teeth and these teeth are formed quite accurately as to outline and depth. The sleeve 25 is provided near its rear end with external gear teeth 40 which when the sleeve 25 is moved to the right, looking at Fig. 1, engage with the teeth 39 thereby clutching the pinion 24 with the sleeve and as this sleeve is splined on the shaft 16, clutching the pinion 24 with the shaft 16. The depth of the teeth 39 and 40 is such that when the clutch is in engagement, the pinion 24 is centered and supported on the tops of the teeth 40. When this clutch is in engagement the drive will be from the shaft 9 and the internal gear 12 through the external eccentric gear 21 the hub 20 the internal eccentric 23 the pinion 24 and sleeve 25 to shaft 16 and due to the ratio of these gears the shaft 16 will be driven at a higher speed than the speed of the shaft 9, and the automobile thereby operated at an overspeed.

The bottom of the casing 1 is closed by a suitable cover member 41 which is made removable for the purpose of assembly, as I have found that the internal gear cluster may be more readily inserted in position from the bottom with the countershaft carrying the gears 27, 30 and 32 assembled in position after the assembly of the remaining parts.

I claim as my invention:

1. The combination with a casing, a driving shaft, a driven shaft extending into said casing, a hub surrounding the axes of said shafts, a gear driving connection between said hub and said driving shaft, a gear driving connection between said hub and said driven shaft, a pair of spaced apart bearings in said casing for said hub, a driving gear on said hub between said bearings, a supplemental shaft, a gear on said supplemental shaft driven from said driving gear and means for drivingly connecting said driven and supplemental shafts.

2. The combination with a casing, a driving shaft, a driven shaft extending into said casing, a hub surrounding the axes of said shafts, a pair of spaced apart bearings in said casing for said hub, a driving gear on said hub between said bearings, a driving connection between said hub and said driving shaft including an internal gear on one of said members and an external gear on the other of said members meshing with said internal gear, a supplemental shaft, a gear on said supplemental shaft driven from said driving gear, means for drivingly connecting said hub with said driven shaft and means for drivingly connecting said driven and supplemental shafts.

3. The combination with a casing, a driving shaft, a driven shaft extending into said casing, a hub surrounding the axes of said shafts, a pair of spaced apart bearings in said casing for said hub, a driving gear on said hub between said bearings, a driving connection between said driving shaft and said hub including an internal gear on said driving shaft and an external gear on said hub meshing with said internal gear, a supplemental shaft and a gear on said supplemental shaft meshing with said driving gear, means for drivingly connecting said hub with said driven shaft and means drivingly connecting said driven and supplemental shafts.

4. The combination with a casing, a driving shaft, a driven shaft extending into said casing, a hub surrounding the axes of said shafts, a pair of spaced apart bearings in said casing for said hub, a driving gear on said hub between said bearings, a transmission gearing for said driven shaft including an internal gear on said driving shaft, an external gear arranged to be connected with said driven shaft, and eccentrically mounted external and internal gears respectively meshing with the internal gear of the driving shaft and the external gear of the driven shaft, said eccentric gears being mounted on said hub, a supplemental shaft, a gear on said supplemental shaft meshing with said driving gear and means for drivingly connecting said driven and supplemental shafts.

5. The combination with a casing, of a driving shaft, a driven shaft extending into said casing, a hub surrounding the axes of said shafts and eccentrically mounted with respect thereto, a pair of spaced apart bearings in said casing for said hub, a driving gear on said hub between said bearings, a transmission gearing for said driven shaft including an internal gear on said driving shaft concentric with said driven shaft, an external gear arranged for connection with said driven shaft and concentric therewith and external and internal gears on said hub meshing respectively with the internal gear of the driving shaft and the external gear of the driven shaft, a supplemental shaft, a gear on said supplemental shaft meshing with said driving gear and means for drivingly connecting said driven and supplemental shafts.

6. The combination with a casing, of a driving shaft, a driven shaft extending into said casing, a hub surrounding the axes of said shafts and eccentrically mounted with respect thereto, a pair of spaced apart bearings in said casing for said hub, a driving gear on said hub between said bearings, a driving connection between said hub and said driving shaft including an internal gear on said driving shaft concentric with the driven shaft, an external gear at one end of said hub concentric with the hub and meshing with said internal gear, an internal gear at the opposite end of said hub concentric with the hub and an external gear adapted to be connected to the driven shaft concentric with said driven shaft and meshing with said internal gear, a supplemental shaft, a gear on said supplemental shaft meshing with said driving gear and means for drivingly connecting said driven and supplemental shafts.

7. The combination with a casing, of a driving shaft, a driven shaft extending into said casing, a hub surrounding the axes of said shafts and eccentrically mounted with respect thereto, a pair of spaced apart bearings in said casing for said hub, a driving gear on said hub between said bearing, the opposite ends of said hub being extended beyond said bearings, a driving train for said driven shaft including an internal gear on the driving shaft concentric with the driven shaft, an external gear on one of the extended ends of said hub meshing with said internal gear and concentric with said hub, an internal gear on the opposite extended end of said hub concentric with said hub and an external gear concentric with said driven shaft meshing with said second mentioned internal gear and adapted to be connected with said shaft, a supplemental shaft, a gear on said supplemental shaft meshing with the driving gear on said hub and means for drivingly connecting said driven and supplemental shafts.

8. The combination with a casing, of a driving shaft, a driven shaft extending into said casing, a hub surrounding the axes of said shafts, a pair of spaced apart bearings in said casing for said hub, a driving gear on said hub between said bearings, a driving transmission for said driven shaft including an internal gear on said driving shaft concentric with said driven shaft, an external gear on said driven shaft concentric with said driven shaft, external and internal gears on said hub eccentric to said driven shaft and respectively meshing with the internal gear on the driving shaft and the external gear on the driven shaft, means for directly connecting said driven shaft to the driving shaft or for connecting the external gear on said driven shaft with the driven shaft, a supplemental shaft, a gear on said supplemental shaft meshing with the driving gear on said hub and means for drivingly connecting said driven and supplemental shafts.

9. In a transmission the combination with a driving shaft and a driven shaft, a sleeve surrounding said driven shaft rotating therewith and slidable thereon, a transmission gear including a pinion having external teeth and internal clutch teeth centering on said sleeve and an internal gear meshing with the external teeth of said pinion, means for drivingly connecting said internal gear to the driving shaft, said sleeve having external clutch teeth adapted to mesh with the clutch teeth of said pinion, the height of said teeth being substantially the same as the height of the internal clutch teeth of the pinion whereby when the two sets of teeth are intermeshed the pinion will be centered on the clutch teeth of the sleeve.

10. The combination with a casing, of a driving shaft, a driven shaft extending into said casing, a hub surrounding the axes of said shafts eccentrically to said shaft, a pair of spaced apart bearings in said casing for said hub, a driving gear on said hub between said bearings, a sleeve surrounding said driven shaft within said hub slidable on said shaft and rotatable therewith, a transmission train including an internal gear on said driving shaft concentric with the driven shaft, an external gear on the hub meshing with said internal gear and concentric with the hub, an internal gear on said hub concentric therewith, an external gear on said sleeve and concentric with the driven shaft and meshing with the internal gear, internal clutch teeth on the driving shaft and external clutch teeth on the sleeve arranged to mesh therewith, internal clutch teeth on the gear surrounding said sleeve and external clutch teeth on said sleeve arranged to mesh therewith, a supplemental shaft, a gear on said supplemental shaft meshing with said driving gear and means for drivingly connecting said driven and supplemental shafts.

11. In a transmission a first shaft, an aligned second shaft, a clutch for directly connecting said shafts, a member eccentrically located around the axis of said aligned shafts, external internal gearing between said first shaft and said eccentrically located member and external internal gearing between said eccentrically located member and said second shaft, a countershaft, direct gearing between said eccentrically located member and countershaft and between the countershaft and said second shaft and means for controlling the external internal gear train and for controlling the countershaft gear train.

12. In a transmission, aligned driving and driven shafts, a gearing eccentrically surrounding said shafts and in driving engagement with one of said shafts, a countershaft parallel to one of said aligned shafts, interengaging external gears on said countershaft and eccentric ring, and shiftable gearing to effect driving engagement between the countershaft and other shaft and means for controlling the drive between the eccentric ring and the other shaft.

In witness whereof, I have hereunto set my hand at Muncie, Indiana, this 27th day of February, A. D. one thousand nine hundred and twenty-six.

JOHN M. SIMPSON.